Figure 1:
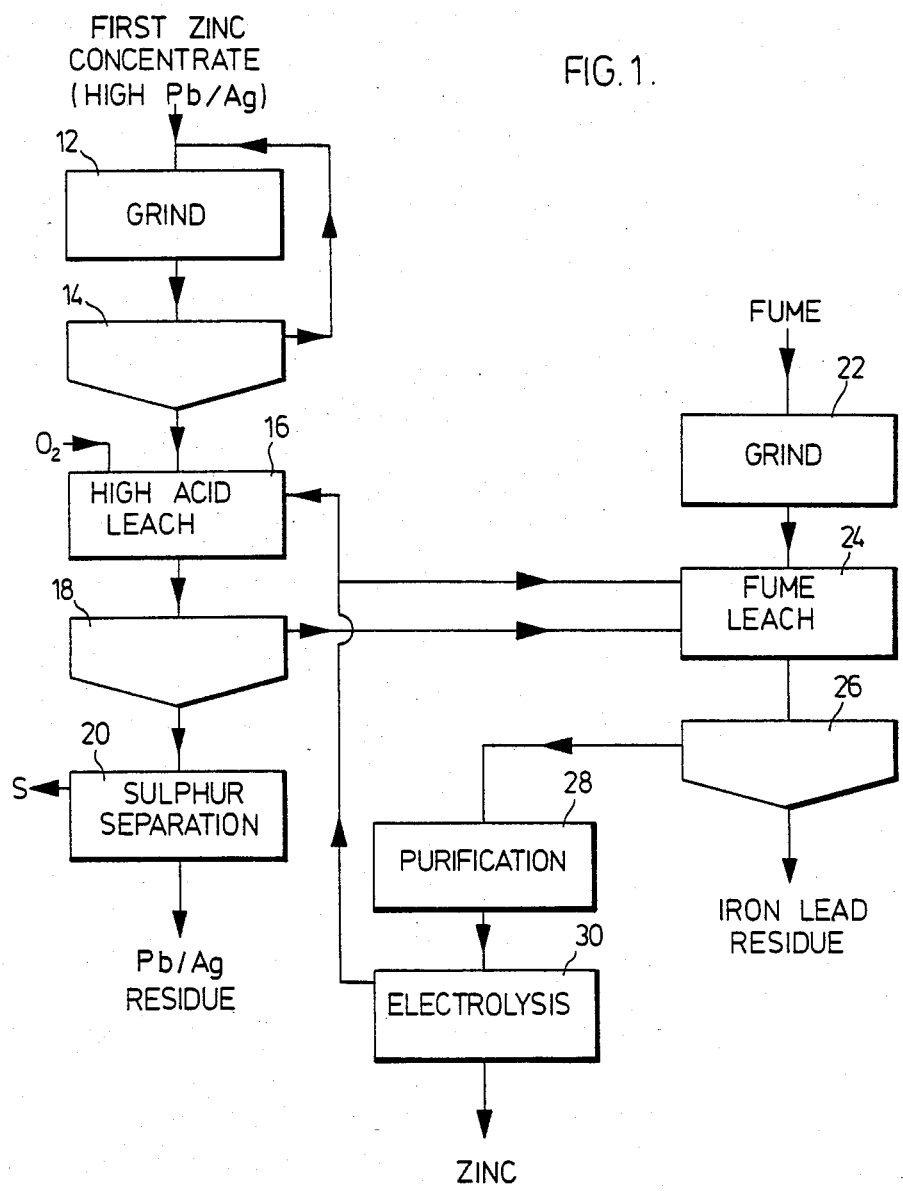

United States Patent [19]

Weir et al.

[11] Patent Number: 4,505,744
[45] Date of Patent: Mar. 19, 1985

[54] RECOVERY OF ZINC FROM ZINC CONTAINING SULPHIDIC MATERIAL

[75] Inventors: Donald R. Weir; Ian M. Masters; Gerald L. Bolton, all of Fort Saskatchewan, Canada

[73] Assignee: Sherritt Gordon Mines Limited, Toronto, Canada

[21] Appl. No.: 508,699

[22] Filed: Jun. 28, 1983

Related U.S. Application Data

[63] Continuation-in-part of Ser. No. 282,576, Jul. 13, 1981, abandoned.

[30] Foreign Application Priority Data

May 22, 1981 [CA] Canada .................................. 378074

[51] Int. Cl.$^3$ ........................ C22B 19/00; C01G 5/00; C01G 21/00; C01B 17/02
[52] U.S. Cl. ........................................ 75/120; 423/27; 423/41; 423/98; 423/109; 423/140; 423/150; 423/567 A; 75/101 R; 204/119
[58] Field of Search ....................... 423/95, 92, 98, 106, 423/109, 146, 150, 578 A, 41; 75/120, 118 R, 101 R, 108; 204/119, 120

[56] References Cited

U.S. PATENT DOCUMENTS 3,867,268  2/1975  Kawulka et al. ..................... 75/120
4,063,933  12/1977  Peters ................................... 75/120
4,440,569  4/1984  Weir et al. .......................... 423/140
4,443,253  4/1984  Weir et al. .......................... 423/109

Primary Examiner—John Doll
Assistant Examiner—Robert L. Stoll
Attorney, Agent, or Firm—Robert F. Delbridge; Arne I. Fors

[57] ABSTRACT

A process for recovering zinc from zinc-containing sulphidic material which also contains iron and lead includes leaching the material under oxidizing conditions at a temperature in the range of from about 130° to about 155° C. in aqueous sulphuric acid solution with a stoichiometric excess of sulphuric acid relative to the zinc content of the material of from about 50 to about 100% to produce an undissolved residue containing a major proportion of the lead and a leach solution containing a major proportion of the zinc and iron. The sulphur and lead containing residue is separated from the zinc and iron containing leach solution. Elemental sulphur is physically separated from the remaining lead-containing residue, and the remaining lead-containing residue is recovered. The zinc and iron containing leach solution is treated to recover zinc by feeding the solution to another process in which zinc-containing material is treated to recover zinc and which includes an iron-precipitation step.

14 Claims, 4 Drawing Figures

RECOVERY OF ZINC FROM ZINC CONTAINING SULPHIDIC MATERIAL

This is a continuation-in-part of application Ser. No. 282,576 filed July 13, 1981, now abandoned.

This invention relates to the recovery of zinc from zinc-containing sulphidic material which also contains iron and lead.

It is known to recover zinc from zinc-containing sulphidic material by leaching the material under oxidizing conditions at elevated temperature in aqueous sulphuric acid solution to provide an undissolved residue and a leach solution containing dissolved zinc. After carrying out any necessary purification steps, the purified leach solution is electrolyzed to produce elemental zinc. Most zinc-containing sulphidic material usually also contains iron, and it is also known that the presence of iron is desirable because it assists the oxidation leaching of sulphidic material and hence assists in obtaining adequate dissolution of zinc. It is usual for the leach to be commenced with a slight stoichiometric excess of sulphuric acid relative to the amount of zinc in the zinc-containing material, for example with the molar ratio of sulphuric acid to zinc being about 1.1:1, that is to say with about 10% excess sulphuric acid. Our U.S. Pat. No. 3,867,268 issued Feb. 18, 1975 teaches that for the purpose of recovering zinc (see column 4, lines 30 to 39) any stoichiometric acid excess relative to the zinc should not exceed 1.2:1, i.e. 20% as this would result in the amount of dissolved iron and free acid in the leach end solution being undesirably high.

Thus, with a conventional stoichiometric excess of acid, iron is also dissolved, and thus is present in the leach solution. Because the subsequent zinc electrolysis step requires that the zinc-containing solution to be electrolyzed by substantially iron-free, it is necessary to remove iron in a purification step, even though the leach may be conducted in such a way that a minimal amount of iron is dissolved.

Zinc-containing sulphidic material may, in addition to iron, also contain lead, and in some cases the lead content may be sufficiently high to render recovery of both lead and zinc. In zinc recovery processes such as described above, substantially all of the lead remains in the leach residue together with most of the iron. The presence of iron in the residue complicates the subsequent recovery of lead therefrom.

According to the present invention, zinc-containing sulphidic material which also contains iron and lead is leached under oxidizing conditions at a temperature in the range of from about 130° C. to about 155° C. in aqueous sulphuric acid solution with an initial substantial stoichiometric excess of sulphuric acid relative to the zinc content of the material of from about 50 to about 100% excess of sulphuric acid. It has been found that such an acid excess results in the dissolution of a substantial amount of iron as well as zinc but without any significant dissolution of lead. Thus, the leach residue produced in accordance with the invention is relatively iron-free. Further, it has been found that elemental sulphur produced in the leaching step and consequently also present in the residue is easily physically separable from the remaining lead-containing residue.

The leach solution containing dissolved zinc thus also contains a substantial amount of dissolved iron and free sulphuric acid. In accordance with a further feature of the invention, the leach solution is treated to recover zinc by feeding the solution to another process in which zinc-containing material is treated to recover zinc and which includes an iron-precipitation step.

The iron precipitation step may be a leach step of another zinc recovery process in which zinc oxide containing material is leached in aqueous sulphuric acid solution under conditions such that iron is precipitated and reports in the leach residue. The zinc oxide containing material may for example be fume or calcine, fume being obtained from lead blast furnace slag and calcine being obtained by roasting a zinc-containing sulphidic material. Such material often contains arsenic and/or antimony, which tends to dissolve in the leach, and the dissolved iron besides being precipitated also causes precipitation of dissolved arsenic and/or antimony. A further advantage is that excess acid in the leach solution is neutralized by the zinc oxide containing material.

Alternatively, the iron-precipitation step may be a leach step in another zinc recovery process in which zinc is recovered from a zinc-containing sulphidic material which also contains iron by leaching in an aqueous sulphuric acid solution with little or no stoichiometric excess of sulphuric acid relative to the zinc content of the material. The majority of the dissolved iron is precipitated and reports with the leach residue. This alternative is useful for example if the further zinc-containing sulphidic material contains minor amounts of lead whose recover is not economically desirable.

In another alternative, the iron-precipitation step may be a purification step in a zinc recovery process in which further zinc-containing sulphidic material which also contains iron is first roasted to produce zinc oxide containing material, which is then leached in aqueous sulphuric acid solution. The leach solution with dissolved iron in accordance with the invention is then utilized in a jarosite or goethite precipitation step in which a major portion of the iron dissolved in both processes is precipitated.

Figure 2:
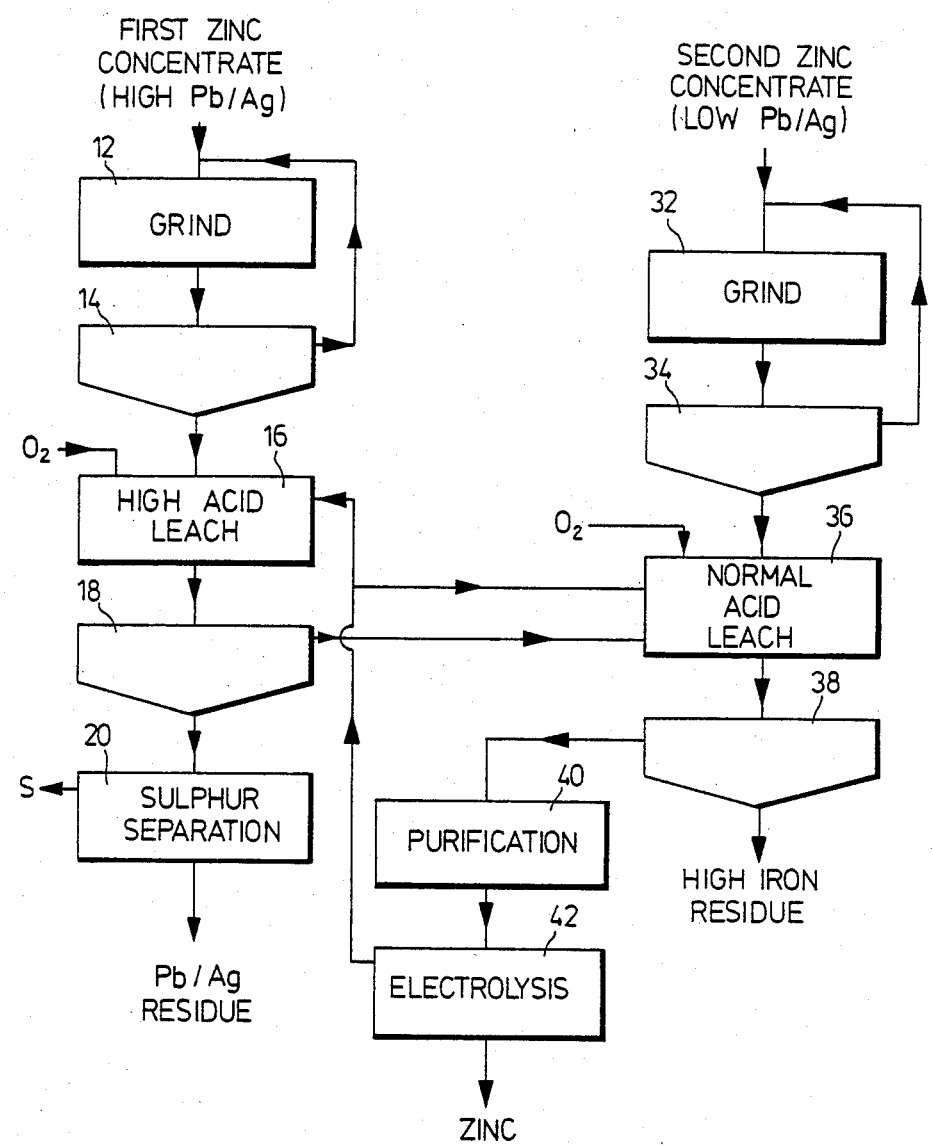
Figure 3:
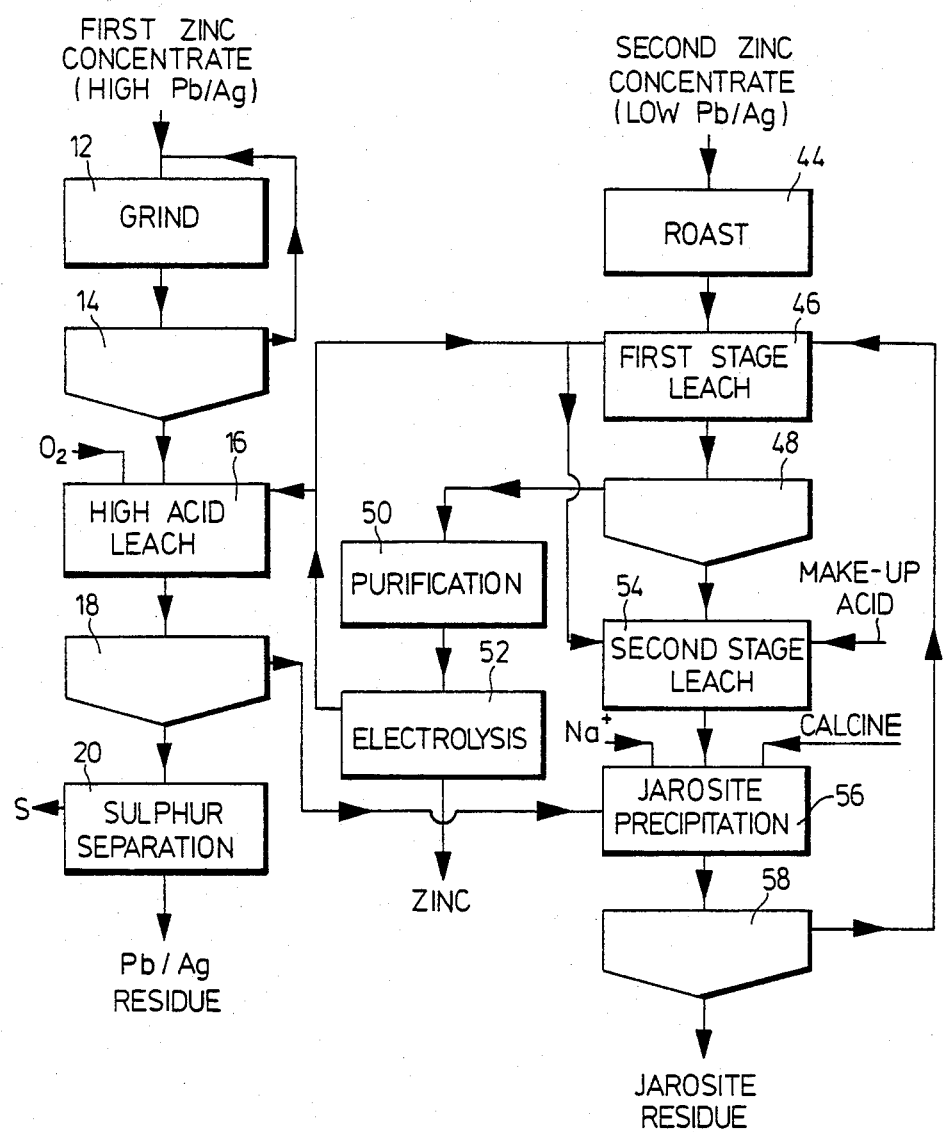
Figure 4:
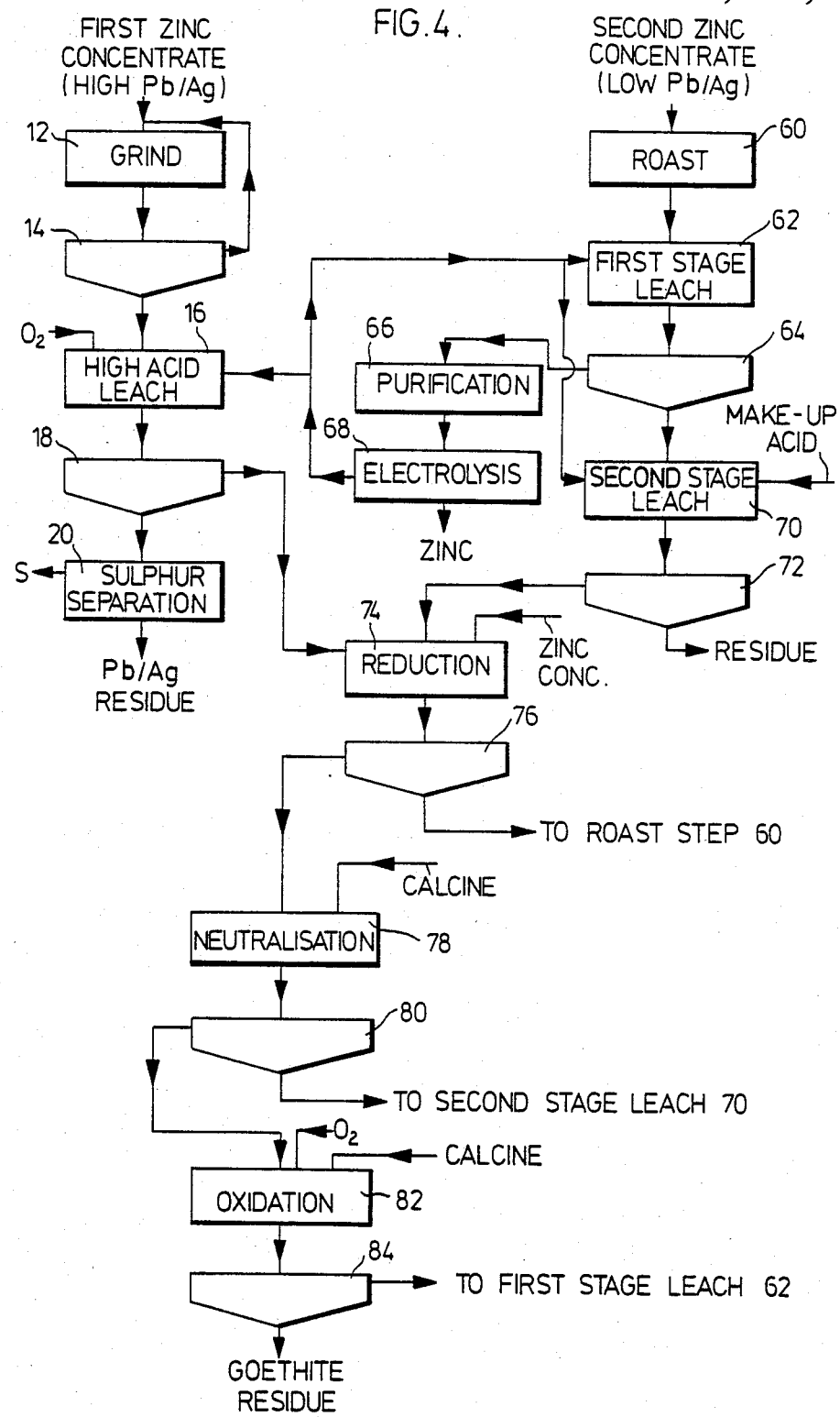

Embodiments of the invention will now be described, by way of example, with reference to the accompanying drawings, of which:

FIG. 1 is a diagrammatic view of a high acid leach process used in conjunction with a process for recovering zinc from zinc oxide containing material, FIG. 2 is a similar view showing the high acid leach process of FIG. 1 used in conjunction with another process for recovering zinc from zinc-containing sulphidic material, FIG. 3 is a similar view showing the high acid leach process of FIG. 1 used in conjunction with a jarosite precipitation step in another zinc recovery process, and FIG. 4 is a similar view showing the high acid leach process of FIG. 1 used in conjunction with a goethite precipitation step in another zinc recovery process.

Referring first to FIG. 1 of the drawings, a process in accordance with one embodiment of the invention is used for recovering zinc, lead and silver from a zinc-containing sulphidic concentrate containing from about 50 to about 55% zinc, from about 5 to about 10% iron, from about 30 to about 35% sulphur, from about 0.5 to about 5% lead, and from about 0.001 to about 0.1% silver.

The zinc concentrate is mixed with water from a subsequent separation step, as will be described shortly, and subjected to a grinding step 12 in which the material is ground to a small size, for example over 90% less than 325 mesh. The resultant slurry is then passed to a settling tank 14 from which the overflow is recycled to the zinc concentrate being fed to the grinding step 12, and the thickened slurry underflow is fed to a high acid pressure leach step 16, the thickened slurry having a pulp density of from about 50 to about 70% solids.

In the high acid pressure leach step 16, the slurry is mixed with aqueous sulphuric acid solution from a zinc electrolysis step, which will be referred to later, such that there is a stoichiometric excess of sulphuric acid relative to the zinc content of the zinc concentrate in the range of from about 50 to about 100%, preferably in the range of from about 50 to about 60%. The leach step 16 is conducted under a partial oxygen pressure in the range of from about 400 to about 1000 kPa and at a temperature in the range of from about 140° to about 155° C.

The leach step 16 is continued for a period of time until over 97% of the zinc and over 95% of the iron have dissolved. The undissolved residue then contains little iron and contains substantially all the lead and silver in the original zinc concentrate.

The leach slurry is passed to a settling tank 18, from which the overflow leach solution proceeds to another zinc recovery process as will be described shortly. The leach residue underflow slurry contains elemental sulphur, unreacted sulphides and lead-silver containing residue. The elemental sulphur and unreacted sulphides are separated from the lead-silver containing residue in a separation step 20 which may, for example, comprise flotation, screening or decantation. The separated elemental sulphur and unreacted sulphides are filtered by hot filtration to provide pure elemental sulphur on the one hand and a metal sulphides/elemental sulphur cake on the other hand. The cake can be recycled to the leach step 16. The lead and silver containing residue containing over 25% lead, 0.01 to 1.0% silver and less than 4% iron, is amenable to treatment in a lead smelter in known manner to recover lead and silver values.

The overflow solution from the settling tank 18 is an acidic sulphate leach solution containing from about 100 to about 130 g/L zinc, from about 10 to about 15 g/L iron (of which about 5 to 10% is in the ferrous form, the remainder being in the ferric form) and about 30 to about 70 g/L $H_2SO_4$. Substantially no lead or silver is dissolved in the leach step ly.

In another zinc recovery process, zinc oxide containing material obtained as fume from lead blast furnace slag and containing arsenic and antimony is treated to recover zinc. The fume may contain from about 60 to about 70% zinc, from about 5 to about 15% lead, from about 0.1 to about 0.3% arsenic and from about 0.1 to about 0.3% antimony. The fume is subjected to a grinding step 22 in which the material is ground to a small size, for example at least 40% less than 325 mesh.

The ground fume is leached in aqueous sulphuric acid solution in a leach step 24, the aqueous sulphuric acid solution being a mixture of acid solution containing from about 150 to about 180 g/L $H_2SO_4$ from a zinc electrolysis step which will be described later. The leach step 24 is carried out at a temperature of about 90° C. until the pH rises to about 1, that is to say until the sulphuric acid concentration is reduced to about 20 g/L. Acidic solution from the settling tank 18 in the previously described process is then added, together with more fume, and the leach step 24 is continued until the pH has risen to about 4. In this way a substantial amount of zinc is dissolved, and the iron in the acidic solution from the previously described process precipitates substantially all the arsenic and antimony which initially dissolves in the leach solution, with substantially all the iron being precipitated as an oxide.

The leach slurry is passed to a settling tank 26 from which the underflow is a lead and iron containing residue suitable for treatment in a lead smelter. The overflow solution is a substantially iron-free acidic zinc sulphate solution which is purified in a purification step 28 and passed to electrolysis step 30, the solution passed to electrolysis step 30 containing from about 140 to about 160 g/L zinc. After electrowinning, the spent solution contains from about 40 to about 60 g/L zinc and from about 150 to about 180 g/L $H_2SO_4$, and is recycled partly to the high acid pressure leach step 16 and partly to the fume leach step 24 in a ratio depending upon the relative amounts of concentrate and fume to be leached in the respective leach steps 16, 24.

Thus, lead and silver can be more easily recovered from the zinc concentrate, with high zinc recovery still being attained, and by utilizing the leach solution from the high acid leach, zinc can be recovered from the zinc concentrate and from the fume in the same electrolysis step.

Referring now to FIG. 2, zinc concentrate of the same kind as in the previous embodiment, that is to say with a lead and silver content sufficiently high to render the recovery of these metals economically desirable, is treated in a high acid leach process in the same manner as in FIG. 1. In this embodiment, however, the iron-containing acidic leach solution from the settling tank 18 is utilized in a leach step in a zinc recovery process for the recovery of zinc from zinc concentrate containing insignificant amounts of lead and silver. Typically, such a zinc concentrate may contain from about 50 to about 55% zinc, from about 5 to about 10% iron, from zero to about 0.5% lead and from zero to about 0.001% silver.

The low lead/silver zinc concentrate is mixed with water from a subsequent settling step and ground to a small size in a grinding step 32 similar to the grinding step 12. The resultant slurry is then passed to a settling tank 34, with the overflow solution being recycled to the grinding step 32. The underflow slurry with a pulp density of from about 50 to about 70% solids is passed to a leach step 36 in which an aqueous sulphuric acid solution is supplied such that a conventional stoichiometric sulphuric acid excess of about 10% relative to the zinc content is obtained. The acid solution is the iron-containing solution from the settling tank 18 together with part of the acid solution from a subsequent zinc electrolysis step. The leach is carried out under an oxygen partial pressure of from about 400 to about 1000 kPa at a temperature of from about 140° to about 155° C. to obtain extraction of most of the zinc in the low lead/silver zinc concentrate.

Owing to the small excess of acid, most of the iron in the acid solution from the settling tank 18 is precipitated as an iron oxide, and most of the iron dissolved in the leach step from the low lead/silver zinc concentrate is precipitated in a similar manner. The leach slurry is then passed to a settling tank 38, from which the iron containing residue is dealt with as desired. The overflow solution containing from about 140 to about 160 g/L zinc, from about 0.5 to about 5 g/L iron, and about 1 to about 20 g/L sulphuric acid is subjected to an iron removal purification step 40, and to any other necessary purification step, and then to a zinc electrolysis step 42. The spent solution from the zinc electrolysis step 42 contains from about 40 to about 60 g/L zinc and about 150 to about 180 g/L H$_2$SO$_4$ and is recycled partly to the high acid leach step 16 and partly to the normal acid leach step 36.

Thus, zinc is efficiently recovered from both zinc concentrates and the recovery of lead and silver from the first zinc concentrate with relatively high lead/silver content is facilitated.

Referring now to FIG. 3, zinc concentrate of the same kind as treated in the embodiment of FIG. 1, that is to say with high lead-silver content, is treated in a high acid leach process in the same manner as in FIG. 1. In this embodiment, however, the iron-containing leach solution from the settling tank 18 is utilized in a jarosite precipitation step in a roast-leach process for treating zinc concentrate with low lead-silver content.

The low lead-silver concentrate is first roasted in a roasting step 44 at a temperature of from about 900 to about 950° C. to convert the zinc sulphide content to oxide form, with some zinc ferrites thus being produced. The resultant calcine is then subjected to a first stage leach step 46 in which the calcine is leached in aqueous sulphuric acid solution at a temperature of from about 80° C. to about 95° C. to dissolve substantially all the zinc oxide. The aqueous sulphuric acid solution is obtained partly from a subsequent electrolysis step and partly from a jarosite precipitation step as will be described in more detail later, and the first stage leach step 46 is continued to produce a leach solution with a pH of from about 4.5 to about 5.5 and containing from about 140 to about 180 g/L zinc, and less than about 0.01 g/L iron.

The leach solution is separated from undissolved residue in a settling tank 48, and is subjected to a purification step 50 before being passed to an electrolysis step 52 where zinc is recovered. The spent solution from the electrolysis step 52 is recycled partly to the high acid leach 16, partly to the first leach step 46 and partly to a second stage leach step 54, such spent solution containing from about 40 to about 60 g/L zinc, and from about 150 to about 180 g/L sulphuric acid.

The residue from the settling tank 48 is subjected to the second stage leach step 54 in which the residue is leached in strong sulphuric acid solution, containing from about 150 to about 180 g/L sulphuric acid, at a temperature of about 95° C. to dissolve zinc and iron in the zinc ferrites. The second stage leach step 54 received acid from the electrolysis step 52 and also receives fresh acid. The second stage leach step 54 is continued to produce a leach slurry containing in solution from about 90 to about 110 g/L zinc, and from about 10 to about 20 g/L ferric iron, with a sulphuric acid concentration of from about 20 to about 40 g/L.

The leach slurry then passes to a jarosite precipitation step 56 where calcine and the high iron solution from the settling tank 18 are added together with sodium ions, this step being carried out at a temperature of from about 80 to about 90° C. at a pH of about 1.5. Most of the iron in solution is precipitated as sodium jarosite, and the slurry passes to a settling tank 58 where the jarosite and other residue are separated from the remaining solution. The jarosite and other residue are dealt with as desired, and the remaining solution is recycled to the leach 46. The remaining solution contains from about 150 to about 170 g/L zinc, from about 0.5 to about 1 g/L iron, and from about 3 to about 5 g/L sulphuric acid.

Thus, zinc is efficiently recovered from zinc concentrates with both high and low lead/silver contents, and the recovery of lead and silver from the zinc concentrate with high lead/silver content is facilitated.

FIG. 4 shows another embodiment in which zinc concentrate of the same kind as treated in the embodiment of FIG. 1, that is to say with high lead/silver content, is treated in a high acid leach process in the same manner as in FIG. 1. In this embodiment, the iron-containing leach solution from the settling tank 18 is utilized in a geothite precipitation step in a roast-leach process for treating zinc concentrate with low lead/silver content.

The low/lead silver concentrate is first roasted in a roasting step 60 at a temperature of from about 900° to about 950° C. to convert the zinc sulphide content to oxide form, with some zinc ferrites also being produced. The resultant calcine is then subjected to first stage leach step 62 in which the calcine is leached in an aqueous sulphuric acid solution at a temperature of from about 80° to about 95° C. to dissolve substantially all the zinc oxide. The aqueous sulphuric acid solution is obtained partly from a subsequent electrolysis step and partly from a goethite precipitation step as will be described in more detail later, and the first stage leach step 62 is continued to produce a leach solution with a pH of from about 4.5 to about 5.5 and containing from about 140 to about 180 g/L zinc, and less than about 0.01 g/L iron.

The leach solution is separated from undissolved residue in a settling tank 64, and is subjected to a purification step 66 before being passed to an electrolysis step 68 where zinc is recovered. The spent solution from the electrolysis step 68 is recycled partly to the high acid leach 16, partly to the first stage leach step 62, and partly to a second stage leach step 70, such spent solution containing from about 40 to about 60 g/L zinc and from about 150 to about 180 g/L sulphuric acid.

The residue from the settling tank 64 is subjected to a second stage leach step 70 in which the residue is leached in strong sulphuric acid solution, containing from about 150 to about 180 g/L sulphuric acid, at a temperature of about 95° C. to dissolve zinc and iron in the zinc ferrites. The second stage leach step 70 received acid from the electrolysis step 68 and also receives fresh acid. The second stage leach step 70 is continued to produce a leach solution containing from about 90 to about 110 g/L iron and from about 10 to about 20 g/L ferric iron, with a sulphuric acid concentration of from about 20 to about 40 g/L. The leach solution is separated from the undissolved residue in a settling tank 72, the residue being dealt with as desired.

The leach solution is then passed to a reduction step 74 where zinc concentrate and the high iron solution from the settling tank 18 are added, this step being carried out at a temperature of from about 80° to about 100° C. at a pH of from about 0.5 to about 1 to reduce ferric iron to ferrous iron. Unreacted zinc concentrate is separated from the resultant solution in a settling tank 76, and the separated zinc concentrate is recycled to the roasting step 60.

The reduced solution then passed to a neutralization step 78 where calcine is added to raise the pH to about 1.5. Unreacted calcine is separated from the neutralized solution in a settling tank 80 and recycled to the second stage leach step 70. The neutralized solution passes to an oxidation step 82 where air and further calcine are added to cause the precipitation of goethite, this step being carried out at a temperature of from about 50° to 100° C. and at a pH of from about 1.7 to about 3.

The precipitated goethite is separated from the solution in a settling tank 84, and the remaining solution is recycled to the first stage leach step 62. The remaining solution contains from about 130 to about 150 g/L zinc, from about 1 to about 3 g/L iron and from about 1 to about 5 g/L sulphuric acid.

Again, zinc is efficiently recovered from zinc concentrates with both high and low lead/silver contents, and the recovery of lead and silver from the zinc concentrate with high lead/silver content is facilitated.

Comparative tests of zinc concentrate leaches with low and high acid will now be described.

The zinc concentrate used in the tests analyzed Zn—55.2%, Fe—9.44%, $S_T$—31.8%, Pb—1.23% and Ag—0.90 oz/ton (0.003%). The concentrate was ground to 94% minus 325 mesh and was introduced into a 3.8 L titanium lined autoclave together with 2.5 L of synthetic return electrolyte analyzing Zn—50 g/L, $H_2SO_4$—150 to 180 g/L. A surface active agent (lignosol BD) and 3 g/L ferric iron was added to ensure rapid initial oxidation rates. The charge was heated with agitation under a slight oxygen partial pressure to 150° C.

The oxygen partial pressure was adjusted to 700 kPa and the conditions were monitored for 60 minutes. At the end of this time, the autoclave was cooled rapidly to ambient temperature, and the reaction products were discharged. The products were washed through a 100 mesh screen to separate any sulphur-sulphide pellets. The undersize slurry was filtered and the undersize solids (residue) were washed by repulping with water and refiltering. The oversize solids (sulphur/sulphide pellets) and undersize solids were separately dried, weighed and sampled for analysis. The filtered solution, including all the water, were combined, the combined volume was measured, and sampled for analysis.

The results of the tests are shown in the following Table.

in other processes, for example other zinc recovery processes.

Other embodiments of the invention will be readily apparent to a person skilled in the art, the scope of the invention being defined in the appended claims.

What we claim as new and desire to protect by Letters Patent of the United States is:

1. A process for recovering zinc from zinc containing sulphidic material which also contains iron and lead, the process comprising leaching the material under oxidizing conditions at a temperature in the range of from about 130° to about 155° C. in aqueous sulphuric acid solution with a stoichiometric excess of sulphuric acid relative to the zinc content of the material of from about 50 to about 100% to produce an undissolved residue containing a major proportion of the lead and a leach solution containing a major proportion of the zinc and iron, separating the sulphur and lead containing residue from the zinc and iron containing leach solution, physically separating elemental sulphur from the remaining lead-containing residue, recovering the remaining lead-containing reside, and treating the zinc and iron containing leach solution to recover zinc by feeding the solution to a conventional zinc recovery process which includes an iron-precipitating step.

2. A process according to claim 1 wherein the stoichiometric excess of sulphuric acid is from about 50 to about 60%.

3. A process according to claim 1 wherein the material contains from about 50 to about 55% zinc, from about 30 to about 35% sulphur, from about 5 to about 10% iron, and from about 0.5 to about 5% lead.

4. A process according to claim 3 wherein the leach solution contains from about 100 to about 130 g/L zinc, from about 10 to about 15 g/L iron, and from about 30 to about 70 g/L $H_2SO_4$.

5. A process according to claim 1 wherein said zinc and iron containing leach solution is treated by feeding

TABLE

| Concentrate Amount (g/L) | $H_2SO_4$ in Electrolyte g/L | Excess* Acid (%) | Solution Composition g/L | | Residue Fraction | Wt. % of Feed Concentrate | Residue Composition (%) | | | | Extractions (%) | |
|---|---|---|---|---|---|---|---|---|---|---|---|---|
| | | | $Fe_T$ | $H_2SO_4$ | | | Zn | Fe | Pb | Ag oz/t | Zn | Fe |
| 187 | 142.5 | −8 | 0.72 | 6.7 | +100 mesh | 36.8 | 15.8 | 2.99 | | | 81.5 | 9 |
| | | | | | −100 mesh | 22.9 | 1.95 | 41.5 | 4.77 | | | |
| 187 | 150 | −3 | 0.76 | 7.9 | +100 mesh | 28.8 | 10.7 | 2.28 | | | 93.1 | 9 |
| | | | | | −100 mesh | 28.3 | 2.61 | 34.4 | 3.86 | | | |
| 165 | 150 | 10 | 3.4 | 16.0 | combined | 51.1 | 1.09 | 18.0 | 2.28 | | 99.0 | 2.8 |
| 136 | 150 | 33 | 12.2 | 13.0 | +100 mesh | 29.7 | 1.30 | 0.57 | | | 98.9 | 74.0 |
| | | | | | −100 mesh | 11.6 | 1.68 | 19.7 | 9.29 | | | |
| 148 | 180 | 50 | 12.6 | 32.0 | combined | 35.5 | 2.45 | 0.695 | 1.78 | | 98.4 | 97.1 |
| 113.2 | 150 | 60 | 13.2 | 33.0 | +100 mesh | 31.9 | 2.85 | 0.81 | 0.018 | 1.60 | 98.2 | 95.9 |
| | | | | | −100 mesh | 3.6 | 1.59 | 3.51 | 27.5 | 6.2 | | |
| 90.4 | 150 | 100 | 11.2 | 56.8 | +100 mesh | 32.2 | 3.79 | 0.96 | | | 97.6 | 95.5 |
| | | | | | −100 mesh | 3.7 | 2.95 | 3.17 | 27.4 | | | |

*Based on $H_2SO_4$:Zn ratio in leach charge

It will be noted that, at 50 to 100% excess acid in accordance with the invention, iron extractions were about 96 to 97% resulting in low residue weights compared to those obtained with normal acid levels and lower levels. Thus, it will be noted that, at 50 to 100% excess acid, the residue (undersize solids) contained over 27% lead, whereas with normal or lower acid levels, less than 10% lead was present in the residue.

Thus, the excess acid leach in accordance with the invention not only enables lead and silver to be more readily recovered from zinc concentrate, while still enabling zinc to be efficiently recovered, but also provides a high iron solution which can readily be utilized the solution to a further leach step in which zinc oxide containing material is leached in said solution to dissolve zinc from the zinc oxide containing material and to precipitate a substantial amount of dissolved iron, thereby producing an iron containing second residue and a second leach solution containing dissolved zinc and residual iron, separating the second leach solution from the second residue, and recovering zinc from the second leach solution.

6. A process according to claim 5 wherein zinc is recovered from the second leach solution by electrolysis thereby producing a spent solution, and the spent solution is recycled partly to the zinc-containing sulphidic material leach step and partly to the zinc oxide-containing material leach step.

7. A process according to claim 1 wherein the zinc and iron containing leach solution is treated by feeding the solution to a second leach step in which further zinc-containing sulphidic material is leached in said solution under oxidizing conditions at a temperature in the range of from about 130° to about 155° C. to dissolve zinc from the further zinc containing sulphidic material and to precipitate a substantial amount of dissolved iron, thereby producing an iron containing third residue and a third leach solution containing dissolved zinc and residual iron, separating the third residue from the third leach solution, and treating the third leach solution to recover zinc.

8. A process according to claim 7 wherein zinc is recovered from the third leach solution by electrolysis, thereby producing a spent solution, and the spent solution is recycled at least partly to the leach step in which the first mentioned zinc containing sulphidic material is leached.

9. A process according to claim 1 including roasting a second zinc and iron containing sulphidic material to produce a zinc oxide and zinc ferrite containing material, leaching the zinc oxide and zinc ferrite containing material in sulphuric acid solution to dissolve zinc oxide and produce a leach solution containing dissolved zinc and a zinc ferrite containing residue, separating the residue from the leach solution, recovering zinc from the leach solution, leaching the zinc ferrite containing residue in a strong aqueous sulphuric acid solution to dissolve zinc ferrite and produce a leach slurry containing dissolved zinc and iron, feeding said leach solution containing a major proportion of the zinc and iron to the leach slurry together with zinc oxide material to precipitate jarosite, separating the jarosite and other residue from the resultant solution, and recycling the resultant solution to the zinc oxide leach step.

10. A process according to claim 9 wherein zinc is recovered from the leach solution by electrolysis thereby producing a spent solution, and the spent solution is recycled partly to the leach step in which the first mentioned zinc containing sulphidic material is leached, and partly to the leach steps in which the zinc oxide and zinc ferrite containing materials are leached with aqueous sulphuric acid solution.

11. A process according to claim 1 including roasting a second zinc and iron containing sulphidic material to produce a zinc oxide and zinc ferrite containing material, leaching the zinc oxide and zinc ferrite containing material in a weak aqueous sulphuric acid solution to dissolve zinc oxide and produce a leach solution containing dissolved zinc and a zinc ferrite containing residue, separating the residue from the leach solution, recovering zinc from the leach solution, leaching the zinc ferrite containing residue in a strong aqueous sulphuric acid solution to dissolve zinc ferrite and produce a leach solution containing dissolved zinc and iron and an undissolved residue, separating the leach solution from the residue, feeding said leach solution containing a major proportion of the zinc and iron to the leach solution, reducing ferric iron in the combined solution to ferrous iron, neutralizing and hydrolyzing the ferrous iron containing solution under oxidizing conditions to precipitate goethite, and separating the goethite from the remaining solution.

12. A process according to claim 11 wherein zinc is recovered from the leach solution by electrolysis thereby producing a spent solution, and the spent solution is recycled partly to the leach step in which the first mentioned zinc containing sulphidic material is leached, and partly to the leach steps in which the zinc oxide and zinc ferrite containing materials are leached with aqueous sulphuric acid solution.

13. A process according to claim 1 wherein the zinc-containing sulphidic material also contains silver and said undissolved residue contains elemental sulphur and a major proportion of said lead and silver, the process including physically separating elemental sulphur from the remaining lead and silver containing residue, and recovering the remaining lead ans silver containing residue.

14. A process according to claim 13 wherein the material contains from about 0.001 to about 01.% silver.

* * * * *